(12) United States Patent
Jakobsen et al.

(10) Patent No.: US 6,374,108 B1
(45) Date of Patent: Apr. 16, 2002

(54) ASSIGNING AN IP ADDRESS TO A MOBILE STATION WHILE ROAMING

(75) Inventors: Ken Jakobsen, Vaerloese (DK); Rod Averbuch, Buffalo Grove, IL (US); John Hughes, Basingstoke (GB); Kenneth James Crisler, Lake Zurich; Guy George Romano, Elmhurst, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/451,328

(22) Filed: Nov. 30, 1999

(51) Int. Cl.[7] ................................................. H04Q 7/20
(52) U.S. Cl. ...................... 455/432; 455/435; 455/552; 370/338; 370/401
(58) Field of Search .................................. 455/414, 432, 455/433, 435, 445, 466, 552, 553, 556, 557, 422; 370/331, 338, 389, 400, 401, 402, 252; 702/23; 709/226, 239; 713/201, 202

(56) References Cited

U.S. PATENT DOCUMENTS

| | | | | |
|---|---|---|---|---|
| 5,159,592 A | * | 10/1992 | Perkins | 370/401 |
| 5,572,528 A | * | 11/1996 | Shuen | 370/402 |
| 5,812,819 A | * | 9/1998 | Rodwin et al | 713/201 |
| 6,147,986 A | * | 11/2000 | Orsic | 370/331 |
| 6,195,705 B1 | * | 2/2001 | Leung | 455/426 |
| 6,230,012 B1 | * | 5/2001 | Willkie et al. | 455/435 |

* cited by examiner

Primary Examiner—Lester G. Kincaid
(74) Attorney, Agent, or Firm—Colin Treleven; Steven R. Santema

(57) ABSTRACT

A cellular radio communications system comprises: at least one base station for broadcasting radio signals to mobile stations within a cell; a mobile station addressable using IP addresses; and a first controller in the cell of the cellular radio communications system, the first controller being adapted: (i) to receive a request from the mobile station that the cellular radio communication system assign to the mobile station the static IP address previously assigned to the mobile station outside of the cell; (ii) in response to the request from the mobile station, to check with a second controller associated with the location where the mobile station was previously registered that the static IP address has not been assigned to another mobile station; and (iii) to assign the static IP address previously assigned to the mobile station, outside of the cell, to the mobile station for use in the cell, if the static IP address has not been assigned to another mobile station. Alternatively, the first controller may perform the check for availability of the static IP address with a controller associated with the location where the static IP address is registered. The invention also comprises methods of mobile station registration in cellular radio communication systems. The invention enables roaming by a mobile station between cellular systems which are under the control of different Software and Measurement Infrastructures. Mobile stations may be adapted to check one or more timers prior to making the static IP address request.

23 Claims, 5 Drawing Sheets

ASSIGNING AN IP ADDRESS TO A MOBILE STATION WHILE ROAMING

TECHNICAL FIELD

The present invention relates to the field of mobile radio communication systems.

BACKGROUND

Prior art mobile radio communication systems may be divided up into cells. Mobile telephones or mobile radios, henceforth referred to as mobile stations, can move within a cell. Mobile stations can also move from one cell to another.

FIG. 1 illustrates a single cell of a cellular radio system. The elements shown in FIG. 1 show the general scheme of a personal mobile radio (PMR) system 10. Portable radios 2, 4 and 6 of FIG. 1 can communicate with a base station 8. Radios 2, 4 and 6 could equally well be mobile radios mounted in vehicles. Each of the radios shown in FIG. 1 can communicate through base station 8 with one or more other radios. If radios 2, 4 and 6 are capable of direct mode operation, then they may communicate directly with one another or with other radios, without the communication link passing through base station 8. Radios 2, 4 and 6 constitute mobile stations in this system.

Examples of prior art radio systems of the general type illustrated in FIG. 1 are the iDEN and TETRA radio systems.

FIG. 2 shows the arrangement of several cells 110, 120, 130, 140, 150 of a cellular radio system. A 'Software and Measurement Infrastructure' (SwMI) 100 controls these five cells. The SwMI and the cells which the SwMI controls together constitute a radio 'network'. The SwMI is responsible for a variety of functions. These typically include control of the assignment of IP addresses to mobile stations operating in the network, and the routing of communications to and amongst mobile agents in the network. A radio such as those shown as 2, 4 or 6 in FIG. 1 can move from cell to cell within the network, communicating in any of the cells.

The SwMI 100 shown in FIG. 2 performs several functions, indicated as 'FA', 'IP' and 'HA' in block 100. The 'IP' box indicates that the SwMI is responsible for allocating IP addresses (numbers) to radios operating within the cells 110–150. The IP address allows packets of data with the correct IP address to be delivered to the radio within the network. The SwMI will keep a table showing the cell within which a mobile radio is located, in order to be able to route calls to a base station located within communication range of the mobile station.

The 'HA' block in element 100 indicates that the SwMI also performs 'Home Agent' (HA) functions for radios which normally operate in the network. Finally, the 'FA' block in element 100 indicates that the SwMI also performs 'Foreign Agent' (FA) functions for radios which enter the network, but which normally do not operate in that network. The Home Agent and Foreign Agent functions will be explained in greater detail below and in connection with FIG. 4.

Mobile stations may be capable of operating in a number of different networks, for example those in different countries. This is referred to as 'roaming'. Already, a radio designed according to the TETRA standard may roam from one network to another. Within the GSM and PCS 1800 digital mobile telephone standards, mobile telephones may roam between networks and/or countries.

In future, it will be desirable for mobile stations to be reachable easily through Internet Protocol (IP) addressing. It would be particularly desirable for IP addressable mobile stations to be able to roam from one network to another network.

Several schemes have been proposed to allow IP addressable mobile stations to roam within a cellular radio communications network, or between such networks.

Four examples of these schemes are explained below.

Mobile Internet Protocol

A fully mobile internet protocol system has been proposed. In this system, the mobile stations are capable of recognising when they are in a 'foreign' cell which is not part of the network within which they normally operate. The network within which they normally operate is the network in which they are under the control of their 'Home Agent'. The home agent is provisioned with IP addresses for the mobile stations within the network within which the mobile station normally operates. A cell not under control of the home agent is referred to as being under the control of a 'Foreign Agent'.

When a mobile station has moved from its home network to another, foreign network, data packets with IP addresses can still reach the mobile station. The mobile internet protocol allows the home agent to map and encapsulate the IP addresses of mobile stations into a 'care of' address of the foreign agent, for forwarding to the foreign agent.

According to the mobile internet protocol proposal, the mobile stations will be able to transmit information to their Home Agent about the Foreign Agent where they are currently situated. This requires the mobile station to be adapted to recognise that it is not in a cell which is under the control of the Home Agent, and also to recognise the identity of the Foreign Agent, and to provide that information to its Home Agent as part of performing registration with the Home Agent.

iDEN Mobile IP radio

The IDEN Mobile IP radio has a mode where it can perform a mobile IP role as a proxy for non-mobile Data Terminal Equipment (DTE) attached to it. An example of such a DTE might be a lap-top portable computer. In this case, the iDEN radio must be arranged to perform the proxy function, and must itself be mobile IP capable in the sense described above.

Cellular Digital Packet Data Mobility

Cellular Digital Packet Data (CDPD) is a wireless data system used in the USA. In this system, IP addressing whilst roaming is possible only if both the infrastructure and the mobile station are adapted for the mobility function.

Thus in CDPD, IP address roaming is only possible for those handsets which have been adapted appropriately, and for these handsets, only within cells which can support roaming.

TETRA Packet Data Standard

The TETRA packet data standard EPT WG3(98) 005 describes the means for the SwMI to allocate an IP address to a Mobile radio. The IP allocation procedure is part of TETRA 'context activation'. A mobile station performs context activation. Context activation is the act of a mobile station registering with a network to start sending and receiving packet data using IP addressing over the network. The network assigns an IP address to the mobile station at the time of context activation. Thus context activation allows the mobile station to gain an internet connection to send and receive 'IP packets'.

A TETRA radio does not need to perform context activation in order to simply conduct voice communication over a radio network. However, when the radio needs to send packet data over the TETRA network, then the radio must perform context activation. The TETRA radio may be commanded to perform context activation by the user. Alternatively, the radio may realise that it needs to perform context activation due to an outside stimulus, such as when the radio has been connected to a PC, and the PC boots up.

When context activation is complete, the network can map the IP address assigned to a radio to that radio's Individual TETRA Subscriber Identity (ITSI). When the network receives a packet of data for the radio, then the network can locate the radio using the location map which it holds of the radios' ITSI numbers. This then allows the network to forward the data packet to the radio's location within the network.

The IP address allocated to a mobile station in a network can be either 'static' or 'dynamic'. A 'static' IP address is normally an address which the mobile radio asks to use when it performs context activation. This will be the IP address which the mobile radio has used previously.

However, a radio may not specify any particular IP address at context activation. If this is the case, then there are two possible outcomes. Firstly, the network may recognise the mobile station, and allocate to the mobile station the same IP address as the network has previously assigned to that mobile station. This is static addressing, but without the mobile station having specified any IP address it its context activation request. The second possible outcome is that the network assigns any IP address to the mobile which is currently not in use, from the pool of IP addresses available to that network. This is 'dynamic' address allocation. The SwMI holds a pool of IP addresses for use in dynamic allocation. The pool of addresses available to one SWMI may differ from the pool available to another SWMI, for example that of a network in a different country, or that of a network owned by a different company.

The TETRA packet data standard allows the mobile radio to request a specific IP address to be approved by the SWMI. However, the current standard does not provide the means of roaming between different SWMIs.

Looking at the TETRA packet data standard in further detail, this standard defines 3 basic states of the Mobile radio. These are:

(i) Idle—This is the state prior to context activation.
 (ii) Standby—This is the state after context activation.
 (iii) Ready—This is the state during data activity.

The mobile station has two timers. One of these is the 'standby' timer. The standby timer measures the time since context activation. Typically the timer may be set to several hours from context activation before it 'times out', and the mobile station returns to idle mode. When the stand-by timer has expired, a mobile radio needs to perform context activation in order to once more commence data exchange over the network.

The other timer is the 'ready' timer. The mobile radio is in a ready state while it is in active operation, exchanging data packets over the network. The time limit of the ready timer is designed such that, when the ready timer has not yet timed out, the mobile station is likely to still be in an ongoing communication over the network. The ready timer times for typically 10 seconds after the most recent packet data activity. So the state of the ready timer specifies the state of the mobile radio, i.e. whether or not it is currently communicating. When the ready timer times out, the radio returns to the stand-by mode. Expiry of the ready timer does not cause the mobile radio to need to perform context activation in order to commence IP packet data transmission or reception.

In its home network, the mobile radio will keep one IP address until the stand-by timer times out. This means that the mobile will keep one IP address for a fairly long period after it has last sent or received a data packet using that IP address. This period might typically be 24 hours, during which the mobile radio is in stand-by mode. As long as less than this time has elapsed, the mobile radio does not need to perform context activation in order to commence IP data packet transmission or reception. If the mobile re-commences IP data packet transmission or reception when in stand-by mode, the mobile will re-set both the stand-by and ready timers.

However, a mobile radio also needs to perform context activation as soon as it enters a new network. Therefore a mobile TETRA radio will attempt to perform context activation when it enters a cell which is under the control of a Foreign Agent.

Individual TETRA Subscriber Identity Mobility

Individual TETRA Subscriber Identity (ITSI) mobility is a proposal for mobile station mobility within the TETRA standard. This mobility is not based on an IP standard. It requires resource from voice capacity sensitive elements of the infrastructure, such as the Home Location Register (HLR).

A need exists to provide enhancements to the systems and proposals of the prior art.

DETAILED DESCRIPTION OF THE PREFERRED EMBODIMENT

Figure 3:
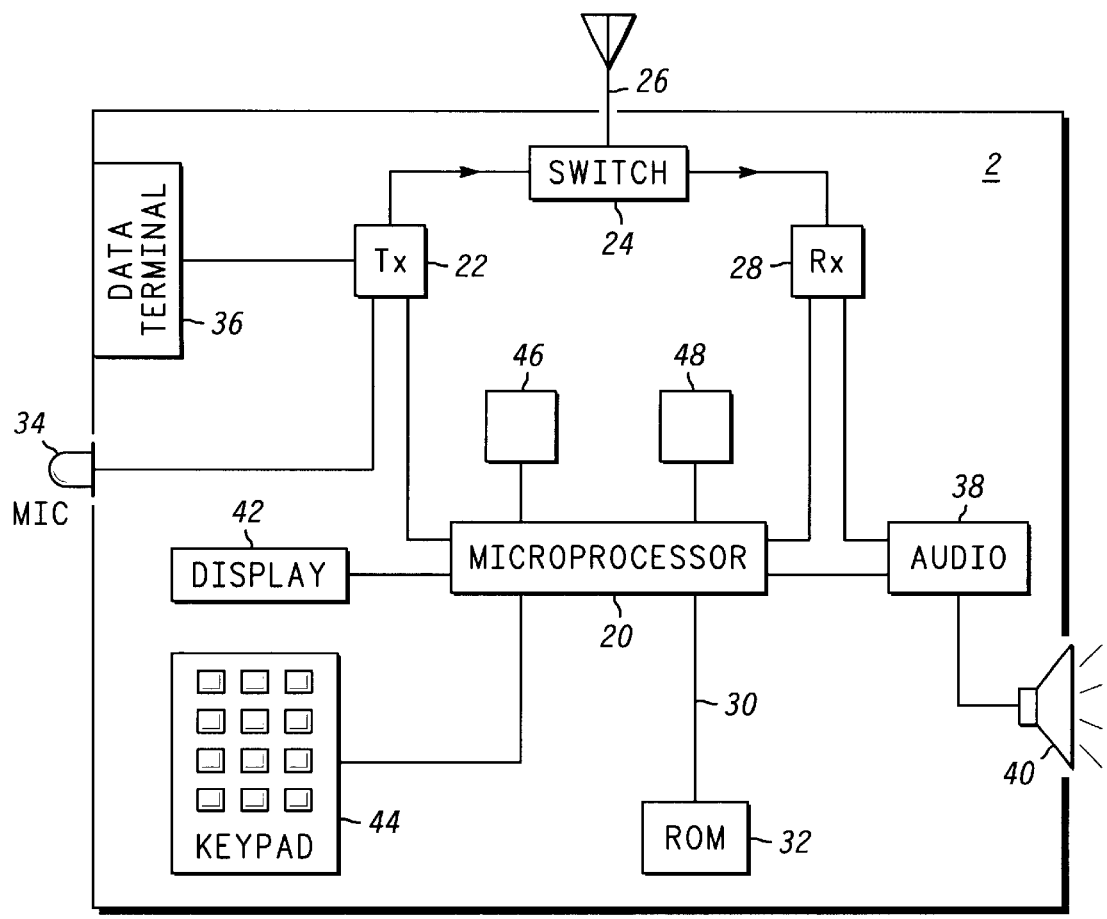
FIG. 3 illustrates one example of a cellular mobile station in accordance with the invention.

FIG. 3 illustrates a mobile station in accordance with the present invention. The mobile station of FIG. 3 is of the form of either a portable- or a mobile radio. However, a mobile telephone may be constructed to function analogously.

The radio 2 of FIG. 3 can transmit speech from a user of the radio. The radio comprises a microphone 34 which provides a signal for transmission by the radio. The signal from the microphone is transmitted by transmission circuit 22. Transmission circuit 22 transmits via switch 24 and antenna 26.

The transmitter 2 also has a controller 20 and a read only memory (ROM) 32. Controller 20 is a microprocessor in the embodiment of FIG. 3. ROM 32 is a permanent memory, and may be a non-volatile Electrically Erasable Programmable Read Only Memory (EEPROM). ROM 32 may contain various different regions of memory.

The radio 2 of FIG. 3 also comprises a display 42 and keypad 44, which serve as part of the user interface circuitry of the radio. At least the keypad 44 portion of the user interface circuitry is activatable by the user. Voice activation of the radio, or other means of interaction with a user, may also be employed.

Signals received by the radio are routed by the switch 24 to receiving circuitry 28. From there, the received signals are routed to controller 20 and audio processing circuitry 38. A loudspeaker 40 is connected to audio circuit 38. Loudspeaker 40 forms a further part of the user interface.

A data terminal 36 may be provided. Terminal 36 would provide a signal comprising data for transmission by transmitter circuit 22, switch 24 and antenna 26. Reception circuit 28 may be adapted to receive data. Received data may be provided from reception circuit 28 to data terminal 36. The connection for this is not shown on FIG. 3, for simplicity of illustration.

Radio 2 is also provided with a 'ready timer' 46 and a 'stand-by' timer 48, whose function will be explained in greater detail later.

Figure 4:
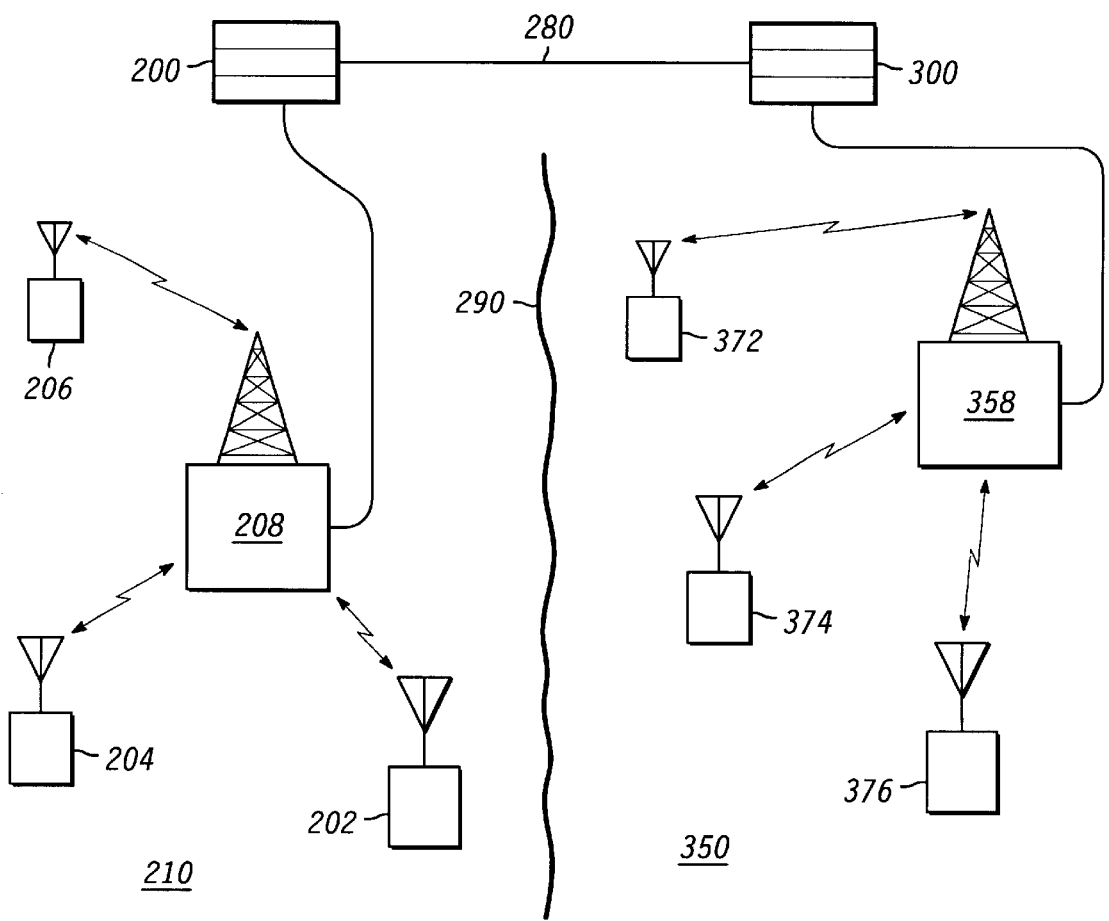
FIG. 4 illustrates the home and visited networks in an arrangement in accordance with the present invention.

FIG. 4 shows an embodiment of a cellular radio communications system in accordance with the present invention. Radio 2 of FIG. 3 may be used in the arrangement of FIG. 4. Mobile station 374 of FIG. 4 is a radio of the form shown in FIG. 3.

The cellular radio communications system of FIG. 4 comprises at least one base station 358 for broadcasting radio signals to mobile stations, such as mobile station 374, within a cell 350. Mobile station 374 is addressable using IP addresses.

The cell 350 occupies the geographical territory schematically illustrated as being to the right of dividing line 290 on FIG. 4. FIG. 4 also provides a schematic representation of another cell 210. Cell 210 is part of a different network than cell 350. Cells 210 and 350 are therefore under the control of different SwMIs.

Figure 1:
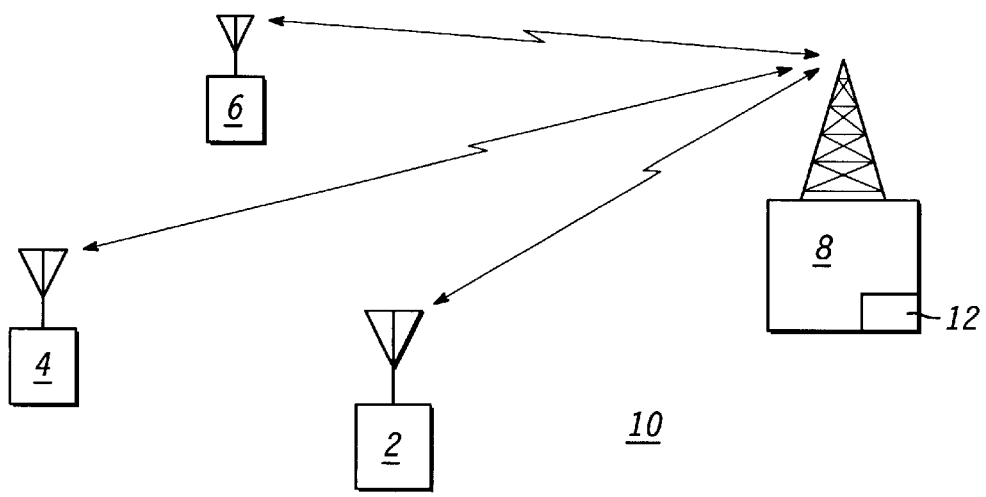
FIG. 1 illustrates a single cell of a cellular radio system in accordance with the prior art.
Figure 2:
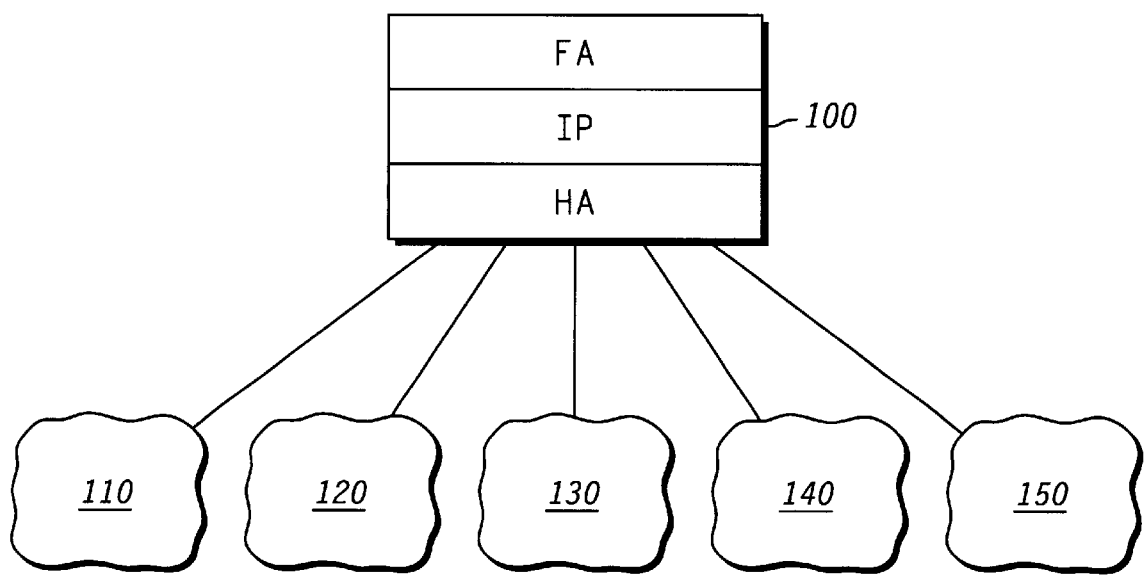
FIG. 2 illustrates a Software and Measurement Infrastructure controlling five cells of a cellular radio system.

The SwMIs controlling cells 210 and 350 are shown at the top of FIG. 4. SwMI 200 controls cell 210. SwMI 200 may control further cells, analogously to the arrangement of FIG. 2. SwMI 300 controls cell 350. SwMI 300 may control further cells, also analogously to the arrangement of FIG. 2.

SwMI 300, cell 350 and other cells controlled by SwMI 300 form a first network. SwMI 200, cell 210 and other cells controlled by SwMI 200 form a different, second network.

Importantly, the mobile station 374 shown in cell 350 originates from cell 210. Therefore SwMI 200 is the 'Home Agent' for mobile station 374. Mobile station 374 therefore nominally 'belongs' to the second network.

FIG. 4 also shows two other mobile stations 372 and 376 in cell 350. These may be other mobile stations that are visiting cell 350 from another network, exactly as mobile station 374 is visiting cell 350. Alternatively, one or both of mobile stations 372 and 376 may normally reside in cell 350 or another cell controlled by SwMI 300, and their home agent will therefore be SwMI 300. The three mobile stations 202, 204 and 206 in cell 210 may likewise normally reside in cell 210, or elsewhere in the network controlled by SwMI 200. However, mobiles 202, 204 and 206 may be visiting cell 210 but normally reside in another network.

Mobile station 374 has entered cell 350. From the perspective of mobile station 374, cell 350 is under the control of a 'Foreign Agent'. The 'foreign agent' function for mobile station 374 is provided by SwMI 300.

The foreign agent controls the assignment of IP addresses to mobile stations within cell 350. In particular, the foreign agent fulfils the role of a first controller within cell 350. Home agent 200 in cell 210 fulfils the role of a second controller within cell 210.

SwMI 300 has been illustrated as being linked via connection 280 to SwMI 200. A physical link is shown, which might for example be a fixed line such as a fibre optic link. However, the SwMIs 200 and 300 may be linked in other ways, such as by radio.

SwMI 300, acting as a first controller for cell 350 of the first network of the cellular radio communications system, is adapted to receive a request from the mobile station 374 that the cellular radio communication system assign to mobile station 374 the static IP address previously assigned to the mobile station outside of cell 350. If mobile station 374 had passed directly from cell 210 to cell 350, then the request from mobile station 374 to SwMI 300, acting as foreign, agent, would be for the same IP address as mobile station 374 had been using in cell 210.

SwMI 300 is further adapted, in response to the request from mobile station 374, to check with SwMI 200 associated with cell 210 that the static IP address requested has not been assigned to another mobile station. Although in this example mobile station 374 has passed directly from cell 210 to cell 350, in general SwMI 300 is adapted to check with the controller of the cell in the location where the mobile station was previously registered. This may have been another foreign agent for mobile station 374, not shown on FIG. 4.

Finally, SwMI 300 is adapted to assign the static IP address previously assigned to mobile station 374, outside of cell 350, to mobile station 374 for use in cell 350, if the static IP address has not been assigned to another mobile station. Registration with the Home Agent of SWMI 300 allows the forwarding of data packets to the SWMI 300 by tunnelling through the network. It is possible that the IP address previously assigned to mobile station 374, outside of cell 350, has been assigned by SwMI 200 to another mobile station, and is therefore no longer available to be assigned by SwMI 300 for use in cell 350. It is also possible that another mobile station already within cell 350 has been given the IP address previously used by mobile station 374, and that for this reason the IP address previously assigned to mobile station 374 is no longer available for assignment by SwMI 300 to mobile station 374 for use in cell 350.

The embodiment of FIG. 4 has been explained in terms of SwMI 300 checking with the SwMI 200, the controller in the location where the mobile station was previously registered, that the static IP address has not been assigned to another mobile station. However, an alternative embodiment of the invention is possible in which the foreign agent checks (that the static IP address has not been assigned to another mobile station) with a second controller that is formed by the SwMI associated with the location where the static IP address is registered. This would be appropriate where the IP address requested by the mobile station on entering cell 350 is identifiable as always belonging to a particular cell. The advantage of this arrangement is that, when a mobile station 374 roams through several networks, it would not then set up a whole chain of network controllers with which foreign agent of SwMI 300 would need to check the availability of the IP address requested by the mobile station 374. Instead, the foreign agent of SwMI 300 could check immediately with the single cell where the static IP address remains registered.

Further enhancements of the cellular radio communications system of the invention are possible. The SwMI 300, acting as first controller, may be further adapted to perform mobile IP registration with the home agent SwMI 200, acting as the second controller, on behalf of mobile station 374. This would provide forwarding of IP packet data to mobile station 374 in cell 350, without the mobile station 374 being a mobile IP capable terminal. Mobile station 374 could then be a simpler terminal without such added functionality. Such an arrangement therefore has the advantage of providing complete IP mobility for mobile stations, using only adaptations to the SwMI of the network which controls cell 350. No adaptation of the mobile station, for example a TETRA radio, would be necessary to facilitate this network roaming. Using the principle of the present invention therefore, an IP addressable mobile station can therefore also be transformed into a roaming mobile IP station, with only changes to the network's infrastructure. This facilitates mobile IP addressing for existing TETRA mobile stations, and can reduce the complexity of future mobile IP stations.

If SwMI 300, acting as first controller, is further adapted to perform mobile IP registration with the home agent SwMI 200 on behalf of mobile station 374, then the SwMI 300 may utilise the mobile station's ITSI number to do this. The ITSI number allows the SWMI to access details of the mobile station stored in the Home Location Register (HLR) of the home SWMI.

FIG. 4 illustrates an arrangement whereby mobile 374 has 'roamed' from one mobile communications network to another. However, mobile 374 may instead initially be connected to a Local Area Network (LAN), for example via a cabled connection at an office workspace. Mobile 374 may then be removed from its wired connection by the user, and need to establish communication through a mobile network. Such a transition may occur similarly to the roaming shown in FIG. 4. A transition from a mobile network back to a fixed LAN may occur analogously.

Mobile station 374 comprises a ready timer 46. Mobile station 374 also comprises a stand-by timer 48. See FIG. 3.

In operation, mobile station 374 performs context activation on entering cell 350. This is because mobile station 374 needs to communicate through SwMI 300, whereas it has previously communicated, in this example, through SwMI 200. However, mobile station 374 may be adapted to check with either a stand-by timer or a ready timer before requesting the static IP address. Mobile station 374 may be adapted to request the same IP address as it had outside of cell 350 only if one of these timers has not timed out.

Mobile station 374 may be adapted:
(i) to check whether ready timer 46 has timed out, and
(ii) if ready timer 374 has not timed out, to request assignment of the static IP address previously assigned to mobile station 374 outside of cell 350.

Mobile station 374 may perform the check whether ready timer 46 has timed out at the time of first context activation in the cell. This will therefore ensure that mobile station 374 requests assignment of the static IP address previously assigned to mobile station 374 outside of cell 350 if mobile station 374 is in the act of transmitting or receiving data at the time of entering cell 350. There is great advantage to mobile station 374 in doing this, since it will ensure that a data exchange which is in progress as mobile station 374 enters cell 350 will continue and be completed using the same IP address throughout the exchange. This enhances the chance of all the IP data packets in the exchange successfully reaching mobile station 374.

Mobile station 374 may alternatively be adapted:
(i) to check whether the stand-by timer 48 of the mobile station has timed out; and
(ii) if the stand-by timer 48 has not timed out, to request assignment of the static IP address previously assigned to mobile station 374 outside of cell 350.

Mobile station 374 may perform the check whether the stand-by timer 48 has timed out at the time of first context activation in cell 350. Thus mobile station 374 will request the static IP address previously assigned to it outside of cell 350 if it is either active or in the idle state at the time of entering cell 350.

Cell 350 may be part of an administrative unit of the cellular radio communication system having a different pool of IP addresses than the location where mobile station 374 was previously registered. This is the case in the example of FIG. 4, the administrative function of assigning IP addresses being performed by SwMI 300, and cell 350 is under the control of a different Switching and Management Infrastructure (SwMI) than the location where the mobile station was previously registered. The cellular radio communication system of the invention may be part of a packet switched data network.

An alternative embodiment was discussed above where the SwMI 300, acting as foreign agent, checks with a second controller associated with the location where the static IP address is registered that the static IP address has not been assigned to another mobile station. In this case cell 350 may be part of an administrative unit of the cellular radio communication system having a different pool of IP addresses than the location where the static IP address is registered. In the example of FIG. 4, the first controller is constituted by the SwMI data controller of cell 350, and cell 350 is under the control of a different Switching and Management Infrastructure (SwMI) than the location where the static IP address is registered. The data controller of a SWMI may have several functions. These are typically the routing of data packets, the tunnelling of data packets from one SWMI to another, and the management, including assignment, of IP addresses.

SwMI 300 may be adapted to assign a new IP address to mobile station 374 from the pool of available IP addresses in the network controlled by SwMI 300 if the static IP address previously assigned to the mobile station outside of the cell has been assigned to another mobile station.

This would mean that the request by mobile station 374 for the static IP address which it had used prior to entering the cell would be unsuccessful. However, this would ensure that mobile station 374 would not be assigned an IP address currently assigned to mobile stations such as 372 or 376. The new IP address assigned to mobile station 374 would then be a dynamic IP address.

Viewed in general terms, the invention provides a technique for roaming between SWMIs. During context activation the mobile station 374 receives an IP address. Outside of its home network, mobile station 374 may claim a static IP address as part of the context activation.

As a mobile station in accordance with the invention roams from its home SWMI to a visited SwMI, new context activation is performed. The invention proposes a traffic mobility, which is based on mobile IP functionality as described in RFC 2002. However, the mobile node functionality is not located in the mobile station. This functionality exists in the visited SwMI infrastructure. The static IP address provided to the roaming mobile station is handled as a mobile IP address by the infrastructure and as an ordinary static IP address by the mobile station.

When the mobile station roams to a visited SwMI constructed in accordance with the present invention, the mobile station may check if its ready timer is on, or may check if the stand-by timer is on. Based on the conditions of one of these timers, the mobile station decides whether or not it wishes to keep the same IP address as previously, in order to keep the IP session alive. If the relevant timer is on, the mobile station requests the same static address as had been allocated by the home SwMI. The visited SwMI checks with the home SwMI if the IP address can still be used. If the answer is yes, then the visited SwMI may perform mobile IP registration on behalf of the mobile station with the home agent, which may in fact reside either in the home SwMI or on the Internet.

The home agent then forwards packets of data addressed for that mobile station to the visited SWMI. The visited SMMI also performs mobile IP Foreign Agent functionality.

If the mobile is an idle state when it enters the visited cell, the mobile station may not request any specific address type. Then the visited SwMI may allocate either a static or a new dynamic address to the mobile station. In the static case the SwMI will allocate the old IP address after verifying with the home SwMI. The visited SwMI will also perform mobile IP registration in the home agent to provide the mobility. If the visited SwMI allocates a dynamic IP address to the mobile station from the pool of IP addresses available to the visited SwMI, then the visited SwMI could perform mobile IP registration of the dynamic IP address in order to provide mobility for that dynamic IP, in a case where the mobile station roams while in a ready state.

The advantages of the invention include providing mobility between SwMIs and maintaining an ongoing IP communication session after roaming to a visited SwMI which normally supports dynamic IP address allocation.

A practical example of roaming between different networks whilst in an ongoing communication would be as follows. An IP addressable TETRA radio may, for example, be operating at the edge of its home network. It may at this time be exchanging packets of data via a radio base station belonging to that network. During this exchange, the TETRA radio may pass into another network, for example that owned by a different company. With the arrangement of the invention, the radio would be able to continue data exchange using the same IP address as it had been using in the home network. The mobile IP registration would be taken care of by the foreign agent (SwMI) in the new network. Forwarding of IP data packets would be carried out by the home agent. This provides continuity of service and a reduced likelihood of losing the call, in comparison to networks which lack the arrangement of the invention.

In addition to the cellular radio communications system explained above, the invention also encompasses a method of mobile station registration in a cellular radio communication system.

The present invention relates to a cellular radio communication system comprising at least one base station for broadcasting radio signals to mobile stations within a cell. The method of mobile station registration in accordance with the invention comprises:

a) a mobile station entering a cell of the cellular radio communication system, the mobile station being addressable using IP addresses;

b) the mobile station requesting that the cellular radio communication system assign to the mobile station the static IP address previously assigned to the mobile station outside of the cell; and c) a first controller associated with the cell checking with a second controller associated with the location where the mobile station was previously registered that the static IP address has not been assigned to another mobile station, and, if the static IP address has not been assigned to another mobile station, the first controller assigning the static IP address previously assigned to the mobile station, outside of the cell, to the mobile station for use in the cell.

An alternative method in accordance with the present invention is possible. This alternative method comprises steps a)–c) above, however in step c) the first controller associated with the cell checks with a second controller associated with the location where the static IP address is registered that the static IP address has not been assigned to another mobile station. This replaces the check with a second controller associated with the location where the mobile station was previously registered, in step c) above.

Figure 5:
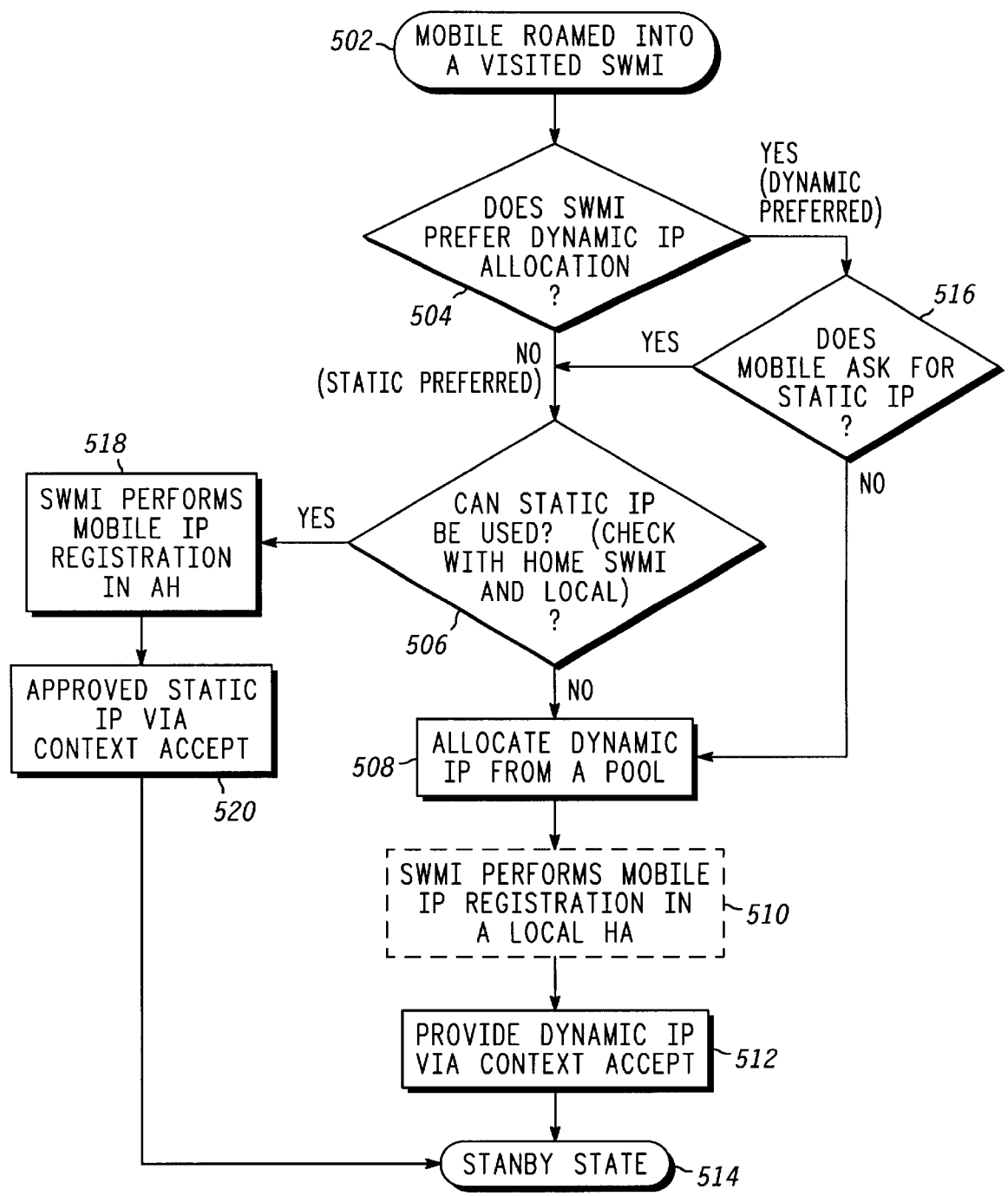
FIG. 5 is a flowchart illustrating IP address allocation and mobile IP registration in accordance with the present invention, from the visited SwMI perspective.

FIG. 5 is a flowchart illustrating IP address allocation and mobile IP registration in accordance with the present invention, from the perspective of the visited SWMI.

Starting at box 502, a mobile roams into an area served by a 'visited' SWMI. If the visited SWMI does not prefer dynamic IP address allocation, see box 504, then the check is made with the home SWMI whether or not the mobile's static IP address is available, see box 506.

If the static IP address is available, then the visited SWMI performs mobile IP registration with the Home Agent, see box 518, and context acceptance indicates approval of the static IP address, see box 520. Then the mobile returns to the standby state, see box 514.

If the check in box 506 reveals that the static IP address is not available, then the visited SWMI allocates a dynamic IP address to the mobile from the pool of IP addresses available to the SWMI, see box 508. The SWMI then performs mobile IP registration in the local Home Agent, see box 510. Step 510 is shown in a dotted box because it is an optional step. The registration of step 510 is usually with the Home Agent of the visited SWMI. The SWMI could be arranged to use Mobile IP addresses from its dynamic pool in order to provide mobility within the SWMI during local sessions.

The dynamic IP address is provided to the mobile via the context acceptance, see box 512. Then the mobile returns to the standby state, see box 514.

If in the check of box 504 the visited SWMI is found to prefer dynamic IP address allocation, then, the mobile may ask for a static IP address to be assigned to it, see box 516. In this case, the process moves to box 506, described above. If the mobile does not ask for a static IP address to be assigned to it, then the process moves from box 516 to box 508, described above.

Thus FIG. 5 shows one process in accordance with the invention.

The step of box 506 may comprise checking with either the location where the mobile was previously registered, or checking with the location where the requested static IP address is registered.

Figure 6:
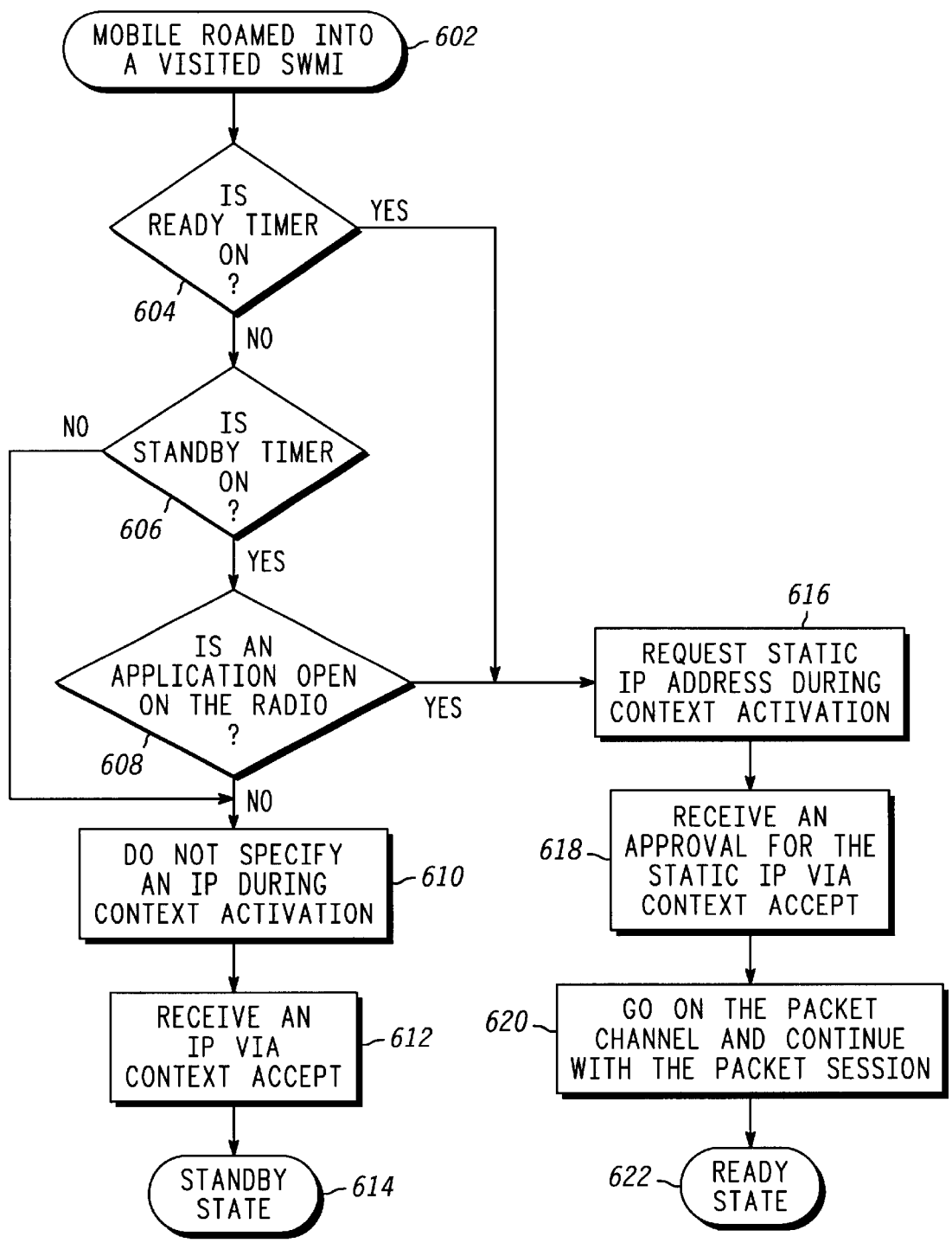
FIG. 6 is a flowchart illustrating the decision process of the mobile station for requesting assignment of a static IP address, from the perspective of the mobile.

FIG. 6 is a flowchart illustrating the decision process of the mobile station for requesting assignment of a static IP address, from the perspective of the mobile.

Starting at box 602, a mobile roams into an area served by a 'visited' SWMI. If the mobile's ready timer is not in the 'on' state, see box 604, then the mobile checks its stand-by timer, see box 606. If the stand-by 5 timer is on, then the mobile checks whether an application is 'open' on the radio, see box 608. An open application is one which is running on the radio. The radio therefore checks in box 608 whether any of its applications is currently running. An example of an application would be an internet browser running on a Motorola 'iDEN' radio.

If there is no application open, or if box 606 produced the result that the stand-by timer was not on, then the mobile does not specify an IP address during context activation, see box 610. The mobile then receives an IP address via the context acceptance, see box 612, and finally is in a stand-by state, see box 614.

If either the ready timer is on, see box 604, or the stand-by timer is on and there is an application open on the radio, see box 608, then the mobile requests a static IP address during context activation. See box 616. The mobile may then receive an approval for the static IP address via the context acceptance, see box 618. The mobile then uses the packet data channel to continue to transmit or receive packets of data, using the static IP address, see box 620. Finally, the mobile is in a ready state, see box 622.

The 'context accept' message of boxes 512, 520, 612 and 618 is a message sent from the SWMI to the mobile station. The context accept message informs the mobile of the IP address which it must use.

What is claimed is:

1. A cellular radio communications system having at least a first and second radio network having different geographical coverage areas, the cellular radio communication system comprising:
   a non-mobile-IP capable mobile station addressable using IP addresses, the mobile station being adapted to roam between the first and second radio network, the first network comprising a home network of the mobile station and the second network comprising a foreign network of the mobile station;
   a fast controller associated with the first network; and
   a second controller comprising infrastructure equipment associated with die second network, the second controller being adapted upon the mobile station roaming from the first network to the second network:
   (i) to receive a context activation request from the mobile station that the cellular radio communication system assign to the mobile station a static IP address previously assigned to the mobile station by the first controller;
   (ii) in response to the request from the mobile station, to check with the first controller that the static IP address has not been assigned to another mobile station;
   (iii) to assign the static IP address previously assigned to the mobile station by the first controller, to the mobile station for use in the second network, if the static IP address has not been assigned to another mobile station; and
   (iv) to perform mobile IP registration with the first controller on behalf of the mobile station.

2. A system in accordance with claim 1, wherein the mobile station comprises a ready timer, the mobile station being adapted:
   (i) to check whether the ready timer has timed out, and
   (ii) if the ready timer has not timed out, to request assignment of the static IP address.

3. A system in accordance with claim 2, wherein the mobile station is adapted to perform the check whether the ready timer has timed out at the time of first context activation in the second network.

4. A system in accordance with claim 1, wherein the mobile station comprises a stand-by timer, and the mobile station is adapted:
   (i) to check whether the stand-by timer of the mobile station has timed out; and
   (ii) if the stand-by timer has not timed out, to request assignment of the static IP address.

5. A system in accordance with claim 4, wherein the mobile station is adapted to perform the check whether the stand-by timer has timed out at the time of first context activation in the second network.

6. A system in accordance with claim 1, wherein the second network is an administrative unit of the cellular radio communication system having a different pool of IP addresses than the first network.

7. A system in accordance with claim 1, wherein the first controller is the SwMI data controller of the first network, and the second network is under the control of a different Switching and Management Infrastructure (SwMI) than the first network.

8. A system in accordance with claim 1, wherein the cellular radio communication system is part of a packet switched data network.

9. A system in accordance with claim 1, wherein the second controller is adapted to assign a new IP address to the mobile station from the pool of available IP addresses for the second network if the static IP address previously assigned to the mobile station by the first controller has been assigned to another mobile station.

10. A system in accordance with claim 9, wherein the new IP address is a dynamic IP address.

11. The cellular radio communication system of claim 1 wherein the first controller is a home agent of the mobile station in accordance with mobile internet protocol.

12. The cellular radio communication system of claim 1 wherein the second controller is a foreign agent of the mobile station in accordance with mobile internet protocol.

13. A method of mobile station registration in a cellular radio communication system, the cellular radio communication system comprising a plurality of radio networks having different geographical coverage areas, the method of mobile station registration comprising:
    a non-mobile-IP-capable mobile station entering a foreign network of the plurality of networks, the mobile station being addressable using IP addresses;
    the mobile station requesting that the cellular radio communication system assign to the mobile station the static IP address previously assigned to the mobile station while in a home network of the plurality of networks; and
    a first controller comprising infrastructure equipment associated with the foreign network checking with a second controller associated with the home network that the static IP address has not been assigned to another mobile station, and, if the static IP address has not been assigned to another mobile station, the first controller assigning the static IP address previously assigned to the mobile station, while in the home network, to the mobile station for use while in the foreign network; and the first controller performing mobile IP registration with the second controller on behalf of the mobile station.

14. A method in accordance with claim 13, wherein the mobile station checks whether a ready timer of the mobile station has timed out, and, if the ready timer has not timed out, then the mobile station requests assignment of the static IP address.

15. A method in accordance with claim 14, wherein the mobile station performs the check whether the ready timer has timed out at the time of first context activation upon entering the foreign network.

16. A method in accordance with claim 13, wherein the mobile station checks whether a stand-by timer of the mobile station has timed out, and, if the stand-by timer has not timed out, then the mobile station requests assignment of the static IP address.

17. A method in accordance with claim 16, wherein the mobile station performs the check whether the stand-by timer of the mobile station has timed out at the time of first context activation upon entering the foreign network.

18. A method in accordance with claim 13, wherein the foreign network is an administrative unit of the cellular radio communication system having a different pool of IP addresses than the home network.

19. A method in accordance with claim 13, wherein the foreign network is under the control of a different Switching and Management Infrastructure (SwMI) than the home network.

20. A method in accordance with claim 13, wherein the cellular radio communication system is part of a packet switched data network.

21. A method in accordance with claim 13, wherein, if the static IP address previously assigned to the mobile station while in the home network has been assigned to another mobile station, then the first controller assigns a new IP address to the mobile station from the pool of available IP addresses in the foreign network.

22. A method in accordance with claim 21, wherein the new IP address is a dynamic IP address.

23. The method of claim 13 wherein the second controller is a home agent of the mobile station in accordance with mobile internet protocol.

* * * * *